March 18, 1924.
J. A. TIFFIN
SAFETY LOCK VALVE
Filed May 17, 1920
1,487,289
2 Sheets-Sheet 1
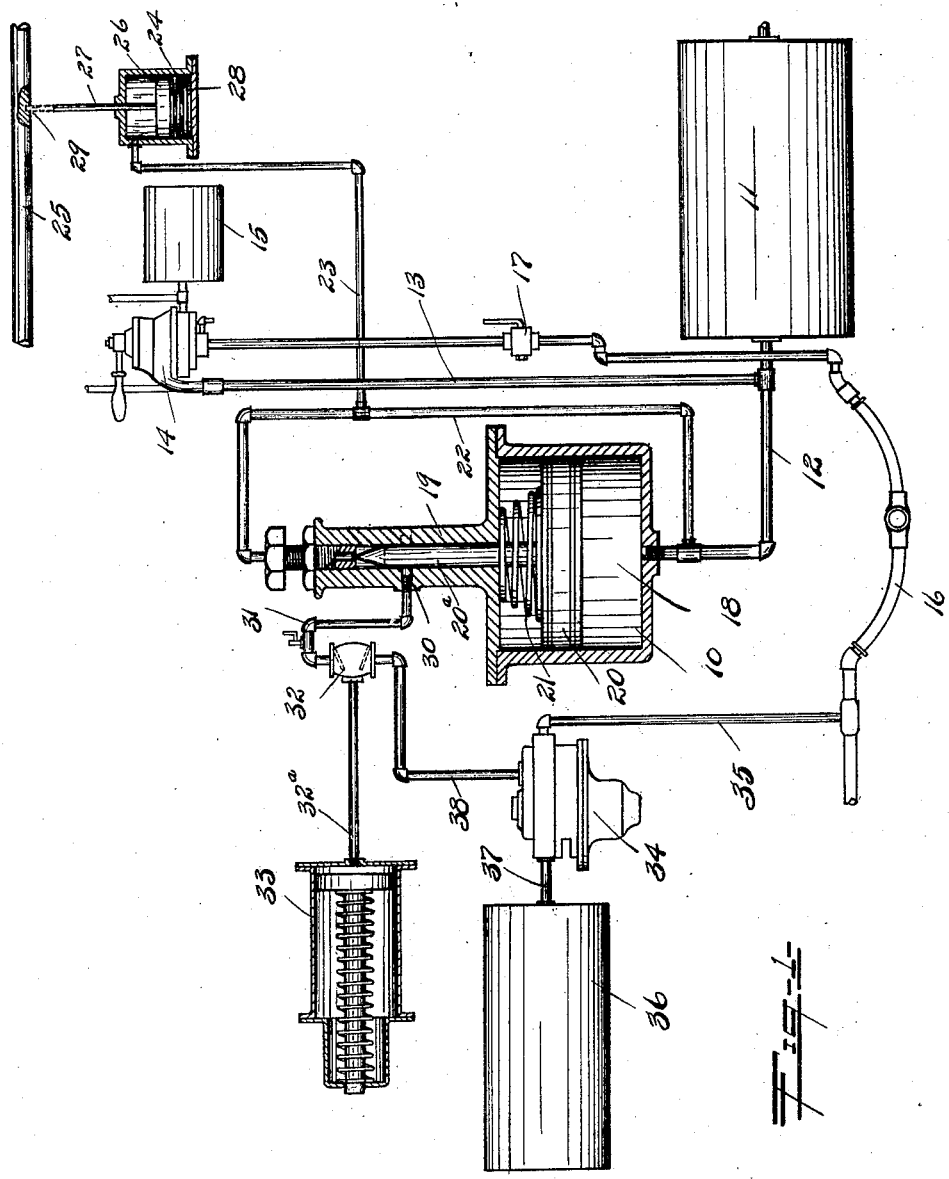
INVENTOR.
John A Tiffin.
BY
ATTORNEYS

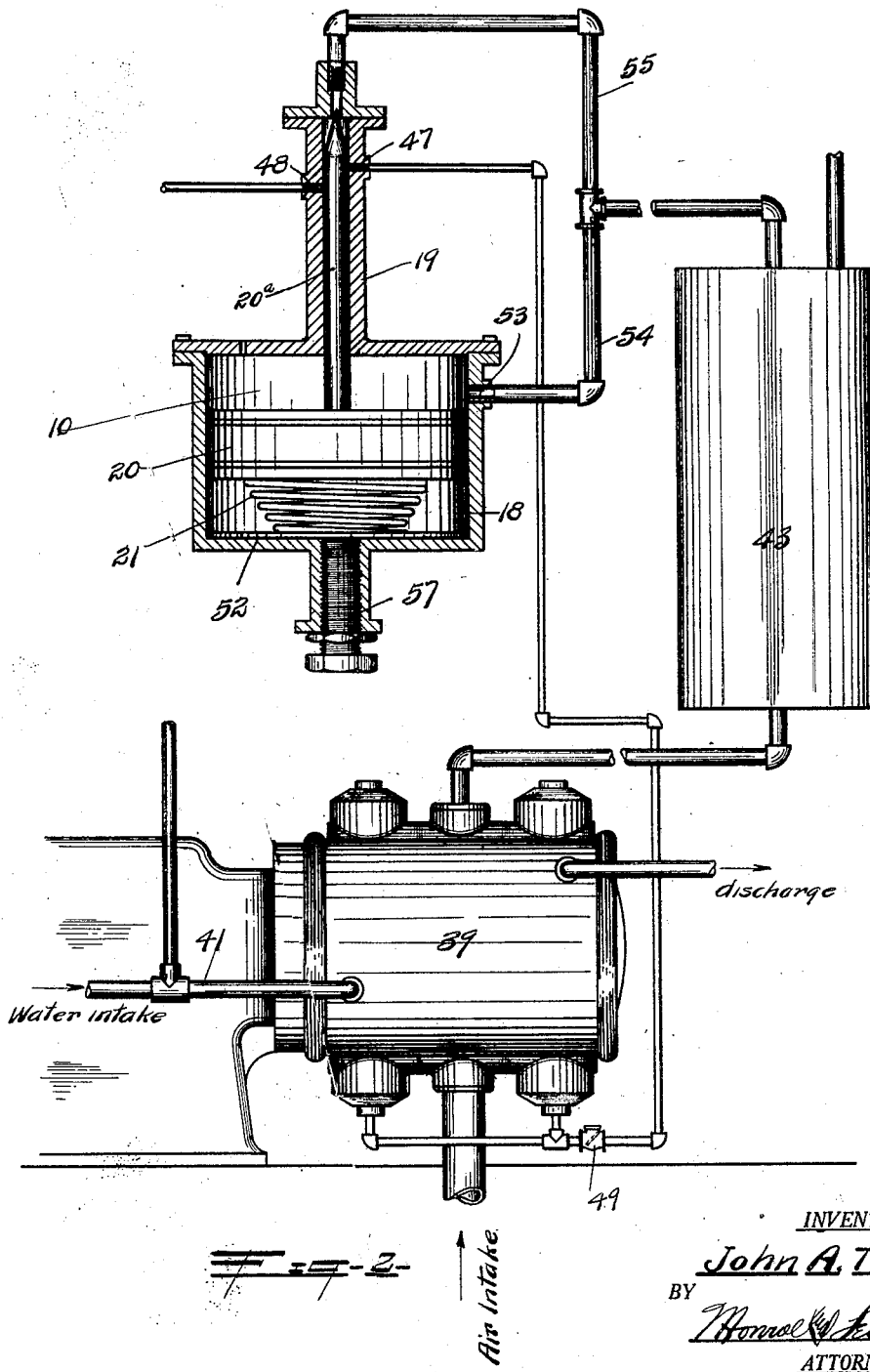

Patented Mar. 18, 1924.

1,487,289

UNITED STATES PATENT OFFICE.

JOHN A. TIFFIN, OF BAY CITY, MICHIGAN, ASSIGNOR, BY DIRECT AND MESNE ASSIGNMENTS, TO DETROIT AUTOMATIC ENGINEERING CO., OF DETROIT, MICHIGAN.

SAFETY LOCK VALVE.

Application filed May 17, 1920. Serial No. 381,944.

*To all whom it may concern:*

Be it known that I, JOHN A. TIFFIN, a citizen of the United States of America, residing at Bay City, in the county of Bay and State of Michigan, have invented certain new and useful Improvements in Safety Lock Valves, of which the following is a specification.

This invention relates to an automatic safety lock valve.

One object of the invention is to design a valve for use on passenger trains, whereby the throttle mechanism of the engine will be automatically locked against movement when the air pressure for operation of the brake is not sufficient for the successful operation thereof. Remaining in said locked position until such time as the supply of air has reached the required pressure.

With the foregoing and other objects in view, the present invention consists in the combination and arrangement of the different parts, hereinafter more fully described, illustrated in the accompanying drawings, and more particularly pointed out in the appended claims, it being understood that changes may be made in the form, size, proportion, and minor details without departing from the spirit or sacrificing any of the advantages of the invention.

In the drawings:—

Fig. 1 is a sectional view of my improved valve, illustrating it as installed in the air line of a train.

Fig. 2 is a sectional view showing the valve applied as a pop valve for an air compressor.

Passenger trains and rolling stock in use on the railroads at the present time are equipped with the customary air brakes, these air brakes are of course very effective so long as there is a sufficient supply of pressure of air to operate same, but this supply of air may be reduced or completely cut off, due to a large number of varied causes, such as, cessation of the air compressing mechanism, bad leaks in the train line, losing of the air by the engineer, and other causes too numerous to mention. When this occurs it will be readily understood that the engineer will not have complete control of the train. It is the rule that an engineer shall not move his engine until the air gauge indicates the required air pressure, and should he lose the air while moving, he is required to stop until such time as the required pressure is obtained, this is not generally observed, due to the fact that the trains must operate on schedule time, and the engineer does not wish to be late, he will therefore operate his engine with insufficient air and trust that the occasion demanding its immediate use will not occur, further, engines are ofttimes backed out of the round house without the air gauge registering the required air pressure, and when the engine is moving it is of course impossible to stop it by means of the brakes, and should the engine run into the pit it would tie up all of the engines in the round house until it is removed, and do considerable other damage to the engine itself.

Referring now more particularly to the accompanying drawings in which I have shown the preferred embodiment of my invention and wherein I have generally designated the valve by the numeral 10, as shown in Figure 1. I have connected the valve to the main air reservoir 11 of an engine by the pipe 12. This reservoir is adapted to be supplied with air from an air compressor (not shown) and with which every engine is equipped. A pipe 13 leading from the main reservoir and connects to the engineer's brake valve 14, and this brake valve is in turn connected to the brake valve reservoir 15, and also to the train line 16, a stop cock 17 being located in the pipe as shown.

The valve proper comprises a large cylinder or shell 18 having a smaller cylinder 19 secured thereto, and which are preferably constructed as a unit. Slidably seated in the large cylinder is the piston 20 formed with a pin or needle valve 20ª integral therewith, and which is adapted to extend into the smaller cylinder 19, a coiled expansion spring 21 being interposed between the top of the cylinder 18 and the piston 20, a by-pass pipe 22 being connected to the pipe 12 and communicating with the top of the cylinder 19 which is internally threaded to receive same.

Connected to this by-pass pipe 22, is the pipe 23 which communicates with the top of a small cylinder 24 located beneath the throttle shaft 25, this cylinder is also provided with a piston 26 having a pin 27 integral therewith, an expansion spring 28 being interposed between the piston and the bottom of the cylinder for shifting the piston when the air pressure thereon is reduced or completely cut off.

The throttle shaft is formed with a pocket 29 therein in which the end of the pin is seated when the air pressure is reduced sufficiently to allow the expansion spring to force the piston to the top of the cylinder, thereby automatically locking the throttle against movement, until such time as the air pressure in the reservoir is sufficient to compress the spring.

A port or opening 30 is provided in the cylinder 19, the needle valve closing said port when the required air pressure is maintained in the reservoir, however, when the pressure is reduced, and the expansion spring shifts the piston and needle valve uncovering the part 30 allowing the air to flow through the by-pass 22 into the cylinder, thence through the pipe 31 and into the double check valve 32 and thence to the brake cylinder 33 thereby automatically applying the brake. This brake cylinder is similar to the brake cylinders on the regular train equipment at the present time and I do not deem it necessary to describe it in detail.

The triple valve 34 is of the usual type and communicates with the train line 16 by means of the pipe 35, and with the auxiliary reservoir 36, by the pipe 37, another pipe 38 connecting the said triple valve with the double check valve 32, a pipe 32ª leading from the check valve to the brake cylinder 33 and it will be obvious that this improved safety valve will not interfere with the operation of engineers brake valve in any manner whatsoever.

The operation of the valve is substantially the same as described and claimed in Letters Patent No. 1,358,798 granted to me on Nov. 16, 1920, with the exception, that instead of connecting the water supply pipe 41 to the valve, I have connected the water discharge pipe 42 thereto, and instead of providing the upper cylinder with the piston, I have provided it merely with a pin or needle valve, the connection from the reservoir 43 to the top of the cylinder being made by the pipe 44 threaded into the adjusting nut 45, otherwise the construction is identical, and should the volume of water discharging through the discharge pipe be reduced or completely cut off, the spring in the cylinder will shift the piston and needle valve, opening the ports 46, 47 and 48 and admitting air to the cylinder 19, the port 47 being first opened establishing communication with the check valve 49, the air passing therethrough and escaping through the manifolds and the air intake pipe of the compressor, the valve next opens the port 48, the air flowing to the small cylinder 50 and forcing the piston up and consequently the switch lever to an off position, thereby cutting off the current and causing the compressor to cease operating.

In Figure 2 I have illustrated the valve used as a safety pop valve, which can be adjusted to operate at any desired pressure, in this instance, the valve is provided with an adjusting nut 51 at the bottom thereof, and annular member 52 being seated in the cylinder, and having the expansion spring 21 interposed between the said member 52 and the piston, a port or opening 53 is provided in the upper portion of the cylinder 18, and which communicates with the reservoir by means of the by-pass 34, the pipe 55 communicating with the top of the cylinder 19 in the usual manner, and it will be obvious that the pressure is the same on the top of the piston and on the needle valve, as it is in the reservoir, the expansion spring therefor determines the pressure at which the reservoir will blow off or pop, and when this pressure is sufficient to shift the piston and compress the spring, the port 47 will first be opened, allowing the air compressor to be idled, the port 48 will next be opened allowing the air to escape to the atmosphere until such time as the pressure in the tank reservoir is reduced to the required gauge pressure, when the expansion spring will shift the piston and needle valve and close the said ports.

From the foregoing description it will be obvious that I have perfected an exceedingly simple and efficient automatic safety valve, which can be applied to a considerable number of different mechanical appliances for the prevention of accidents and loss and destruction of equipment.

What I claim is:—

1. Means for automatically locking the throttle mechanism of a locomotive, comprising means released upon partial failure of the air supply for locking the throttle shaft, and means actuated by said partial failure of the air supply to automatically apply the brakes to the train.

2. In combination with an air pressure reservoir, a spring pressed piston normally held retracted by the air pressure from said reservoir, a pin integral with said piston and adapted to lock the throttle mechanism when the air pressure in the reservoir is reduced or completely cut off.

3. The combination with an air compressor reservoir of a controlling device, comprising cylinders, a piston in one of the cylinders and a pin or needle valve in the other cylinder and connected to the piston, said valve and piston being operated by the varying pressure of the air in the reservoir, and adapted to establish communication with the brake cylinder of a locomotive for automatically applying the brakes.

4. The combination with an air compressor reservoir, of a controlling device comprising cylinders, a piston in one of the cylinders, and a needle valve in the other cylinder and connected to the piston, said valve being operated by the varying pressure in the air reservoir, and adapted upon partial failure of the air supply, to establish communication with the brake cylinder of a locomotive for automatically applying the brakes, and means released by failure of the air supply for automatically locking the throttle mechanism of a locomotive.

5. The combination with an air compressor reservoir, of a controlling device comprising cylinders, a piston in one of the cylinders, and a valve in the other cylinder and connected to the piston, said valve and piston being operated by varying pressure in the air reservoir, thereby establishing communication with the brake cylinder of a locomotive for automatically applying the brakes and simultaneously lock the throttle mechanism.

In testimony whereof I affix my signature.

JOHN A. TIFFIN.